W. C. BANKS.
COUPLING.
APPLICATION FILED AUG. 20, 1913.
1,157,921.
Patented Oct. 26, 1915.
Fig. 1.
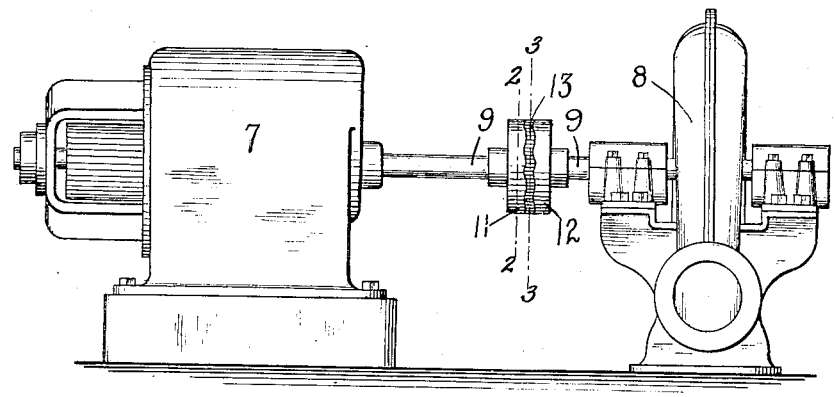
Fig. 2. Fig. 3.
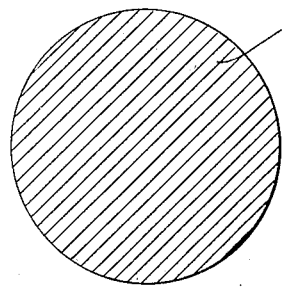 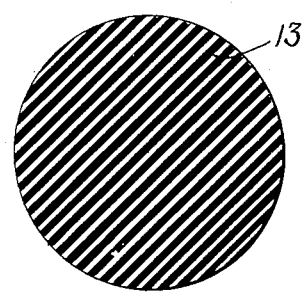
Fig. 4.
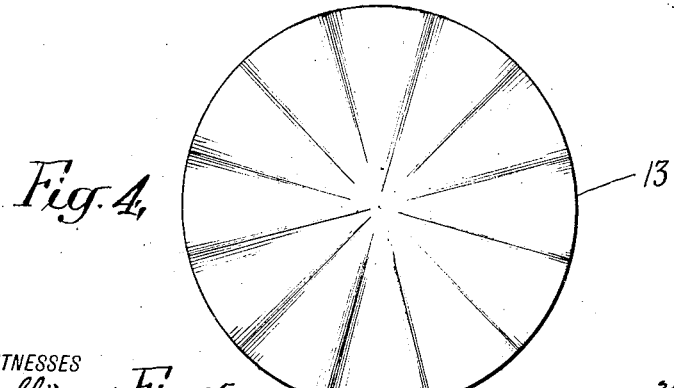
WITNESSES
J. F. Collins
M. S. Gang
Fig. 5.
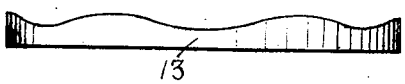
INVENTOR
William C. Banks
BY
Edmonds & Edmonds
ATTORNEYS

UNITED STATES PATENT OFFICE.

WILLIAM C. BANKS, OF NEW YORK, N. Y., ASSIGNOR, BY MESNE ASSIGNMENTS, TO N-W. EQUIPMENT CO., INC., OF NEW YORK, N. Y., A CORPORATION OF NEW YORK.

COUPLING.

1,157,921. Specification of Letters Patent. Patented Oct. 26, 1915.

Application filed August 20, 1913. Serial No. 785,620.

*To all whom it may concern:*

Be it known that I, WILLIAM C. BANKS, a citizen of the United States, residing in the borough of Bronx, city and State of New York, have invented certain new and useful Improvements in Couplings, of which the following is a specification.

This invention relates to insulated couplings for connecting together two rotary elements and transmitting power between them while maintaining them electrically insulated one from the other.

The invention is directed to the provision of a coupling of this character which may be readily manufactured at comparatively low cost and which is more reliable than those heretofore employed in transmitting power while maintaining the requisite insulation.

In many instances, it is necessary to connect two rotary members so that power may be transmitted between them and at the same time have those members electrically insulated. For instance, an electric motor may be connected in driving relation to a blower, pump or analogous piece of apparatus and insulation of the rotary armature of the motor from the apparatus driven thereby may be considered essential. For this purpose, axially alined shafts of the armature and the driven device would be connected by an insulated coupling. Such couplings as heretofore made have consisted usually of two metallic disks adapted to be secured upon the ends of the shafts to be connected, insulating material between the two disks and bolts passing through the two disks and the insulating material between them, each bolt being insulated from one or both of the disks by suitable bushings of insulating material. Couplings made in this manner have not been satisfactory for the reason that they have possessed insufficient strength. The use of bolts in the manner described has been essential to the transmission of the desired amount of power and the insertion of insulating material around these bolts has introduced an element of weakness. As a result, it has frequently occurred that a coupling of this character has broken in some way, as for instance, by cracking of the insulating material around one of the bolts, which has allowed that bolt to come in contact with one of the disks, and by grounding or short-circuiting the armature of the driving motor, has occasioned a substantial loss.

The present invention is directed to the provision of a superior form of insulated coupling which possesses the strength necessary to withstand the torque incident to the transmission of a substantial amount of power notwithstanding the presence of the required amount of insulating material. My improved form of coupling involves the employment of an insulating material which may be caused to adhere to the surface of a metallic member with sufficient tenacity to permit of transmitting power from the metallic member to the insulating material and from the latter to another metallic member solely by reason of the joints between these parts effected by this adhesion. As a result of the employment of metallic members connected together by insulating material in this manner, nothing corresponding to the bolts above referred to in connection with the type of insulated couplings now commonly used is necessary. The element of weakness in this prior type of couplings introduced by the presence of the bolts is therefore eliminated. But the strength necessary for the transmission of power in substantial amounts may readily be obtained by the proper selection of the insulating material and the employment of proper methods in adhering this material to the metallic members. I employ, preferably, rubber as the insulating material for connecting the two metallic members as this is a good insulating material and may be caused to adhere with great strength to metallic surfaces.

My invention therefore consists in the provision of an insulated coupling having the metallic members of the coupling united by a layer of insulating material, preferably rubber, of sufficient thickness to afford the necessary insulation and adhering to the surfaces of the metallic members so as to permit of the transmission of a substantial amount of power through these joints effected by adhesion. The insulating material forms the sole connection between the two metallic members, the use of bolts or other parts corresponding thereto being wholly unnecessary. In addition to its capacity for transmitting a large amount of power while affording the desired insulation, this form of insulated coupling possesses the further advantage that the rubber is resilient to a degree which enables it to absorb shocks and jars to which the mechanism is subjected so that the mechanism is further protected by the use of this form of coupling.

The preferred embodiment of the invention is illustrated in the accompanying drawings in which—

Figure 1 is a view in elevation showing a motor and blower connected by my improved form of coupling, Figs. 2 and 3 are sectional views on lines 2—2 and 3—3 respectively of Fig. 1, and Figs. 4 and 5 are face and edge views of a preferred form of disk or metallic member which may be employed as also shown in Fig. 1.

Referring to these drawings, in Fig. 1 I have shown an electric motor 7 which is adapted to drive the rotary member of a blower 8 or analogous piece of apparatus. The shafts 9 of these two machines are in axial alinement. It is desirable to insulate the armature of the motor 7 from the rotary element of the blower 8 and for this purpose the insulated coupling is employed. The construction of this coupling is illustrated in Figs. 2 to 5.

In Fig. 1, two metallic disks 11 and 12 are shown, each of these being rigidly secured upon the end of one of the shafts 9 so that they are disposed with their faces opposite each other. Between these two disks is insulating material 13 consisting preferably of rubber. This insulating material is caused to adhere to the opposed faces of the disks 11 and 12, the adhesion being such that a substantial amount of power may be transmitted through the joint thus formed between the insulating material and each of the disks. The insulating material forms the sole connection between the two metallic disks 11 and 12. No bolts or corresponding metallic members are required extending from one of the disks to the other. This is shown clearly in Figs. 2 and 3 which are sections transverse to the axis through one of the metallic members and through the insulating material 13, for it will be noted that no bolts appear in these sectional views.

In some instances, I find it desirable to so shape the opposed faces of the disks 11 and 12 as to provide depressions and projections thereon as this tends to relieve the strain on the adhesive joint between the insulating material and the metal when a substantial amount of power is transmitted. Such projections and depressions may be formed in any suitable manner. In Figs. 1, 4 and 5 I have shown the construction which I prefer to employ. In these figures, one of the disks is shown as having its face provided with radial depressions and projections. Such shaping of the operative face of the metallic coupling member increases the area of the surface to which the insulating material may be made to adhere and furthermore relieves the strain on the joint between the insulating material and metal when power is transmitted through the coupling.

Having now described my invention, what I claim as new therein and desire to secure by Letters Patent is as follows:—

1. An insulating-coupling for connecting a pair of alined shafts, comprising a pair of metallic disks arranged opposite each other and having radial depressions and ridges on their opposed faces, and a disk of somewhat flexible insulating material between said faces, conforming to the shape thereof and secured thereto by adhesive material, said insulating disk thus secured constituting the connection between said metallic disks, substantially as set forth.

2. In an insulating coupling, the combination of a pair of alined shafts having metal disks on the adjacent ends thereof, said disks having depressions and projections on their opposed faces, and a rubber disk of substantial thickness between the opposed faces of said metal disks conforming to the shape thereof and secured thereto by adhesive material, said rubber disk thus secured constituting the connection between said metallic disks on said shafts, substantially as set forth.

This specification signed and witnessed this 18th day of August, 1913.

WILLIAM C. BANKS.

Witnesses:
CHARLES W. SCOTT,
FRED DASSAN.